Dec. 8, 1959  R. C. KENDALL  2,915,795
INSULATING JOINT CONSTRUCTION
Filed Oct. 6, 1955

INVENTOR.
R. C. KENDALL
BY
W. A. Schaich & L. D. Soubier
ATTORNEYS

United States Patent Office 2,915,795
Patented Dec. 8, 1959

2,915,795

INSULATING JOINT CONSTRUCTION

Roy C. Kendall, Sylvania, Ohio, assignor, by mesne assignments, to Owens-Corning Fiberglas Corporation, a corporation of Delaware Application October 6, 1955, Serial No. 538,939

5 Claims. (Cl. 20—92)

This invention relates to a joint construction for securement of insulating panels.

It is an object of this invention to provide a joint construction facilitating rapid assembly and disassembly of insulating panel structures in the field.

A particular object of this invention is to provide an economical joint construction that retards the transmission of heat through the joint between adjoining insulating panels in a building structure.

The specific nature of this invention, as well as other objects and advantages thereof, will become apparent to those skilled in the art from the following detailed description, taken in conjunction with the annexed sheet of drawings on which, by way of preferred example only, are illustrated the preferred embodiments of this invention.

Figure 2:
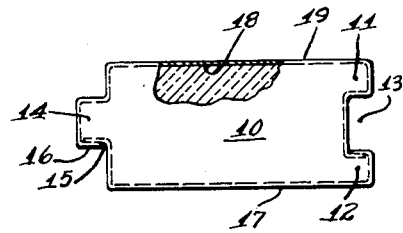
Fig. 2 is a top part sectional view of an insulating panel, showing the tongue and grooved end portions thereof.

In accordance with this invention, and as illustrated in Fig. 2, a joint construction comprising an insulating panel 10 having a pair of ribs 11 and 12 on one end thereof defining a groove 13 intermediate of said ribs 11 and 12, and having a tongue 14 on the oppositely disposed end portion thereof is provided, said tongue 14 being smaller in width than said groove 13 and having a longitudinal notch 15 in the inwardly facing surface 16 thereof.

Figure 1:
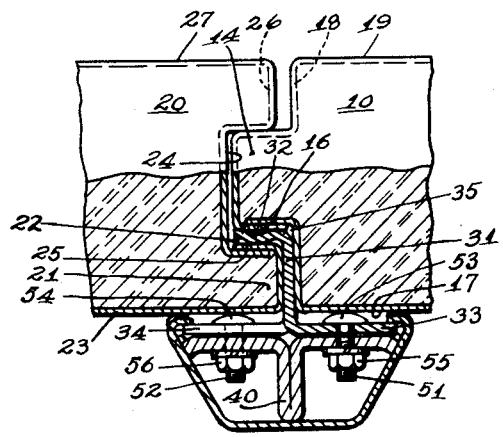
Fig. 1 is a fragmentary top sectional view of the joint construction between two adjacent insulating panels.
Figure 3:
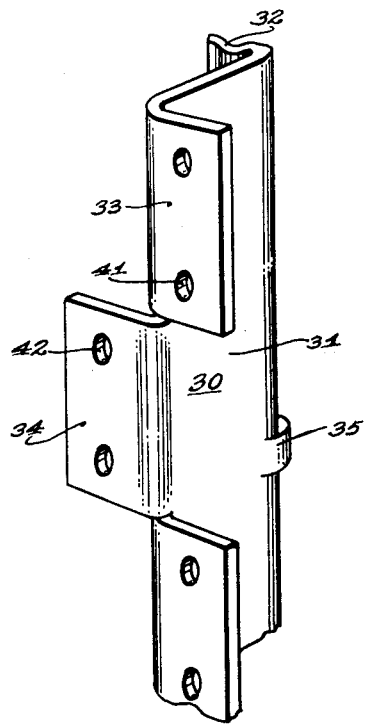
Fig. 3 is a fragmentary elevational view of, in perspective, the T-shaped bracket utilized in the joint construction of Fig. 1.
Figure 4:
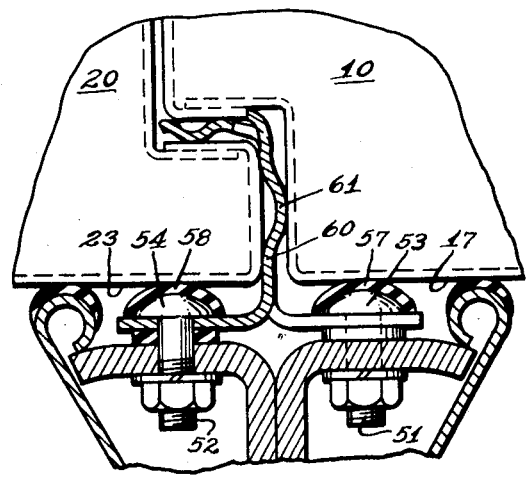
Fig. 4 is a fragmentary top view of a modified joint construction embodying this invention.

As illustrated in Figs. 1 and 4, panel 20 similar in construction to the aforesaid panel 10 is also provided. The panels 10 and 20 are adjoinable in tongue and groove relationship with the inwardly facing surface 16 of tongue 14 cooperating with the rib 21 of panel 20 to define a recess or space 22 intermediate of said rib and said tongue when the outer surfaces 17 and 23 of the panels 10 and 20, respectively, are in alignment.

Although, it is not intended that this invention be limited to such construction, it is advantageous to enclose the panels 10 and 20 within metallic casings 18 and 26 conforming to the general contours of said panels. Additionally, it is particularly advantageous that said casings be constructed in such manner that the inwardly facing sides 17 and 23 thereof are composed of a corrosion resistant material having a low coefficient of thermal conductivity, such as stainless steel, and that the outwardly facing or hot sides 19 and 27 are composed of a lower cost material also having a low coefficient of thermal conductivity, such as a high carbon steel. In this manner, a greater degree of rigidity and protection may be imparted to the structure without greatly detracting from its thermal insulating properties.

A resilient T-shaped bracket 30, preferably of a composition having a low thermal conductivity, having a central body portion or stem portion 31 terminating in a laterally extending bent end portion 32 defining a resiliently shaped non-linear surface configuration, or corrugated construction such as is illustrated, and having a head portion comprised of oppositely disposed flanges 33 and 34 on the other end thereof is provided. A projection 35 which protrudes from the stem portion 31 is insertable in the longitudinal notch 15 in panel 10. Said flanges 33 and 34 are adapted for securement to a support 40 and preferably have bolt holes 41 and 42 extending therethrough.

Fastening means, such as bolts 51 and 52, are provided which are insertable in the holes 41 and 42 in the flanges 33 and 34 for securement of the flanges 33 and 34 to the support 40 by engaging the bolts 51 and 52 with nuts 55 and 56. As illustrated, the heads of the bolts 51 and 52 are positioned intermediate the flanges 33 and 34, respectively, and space same from the outer surface of the panels 10 and 20. Obviously, the metal contact between the flanges and the panels is thereby substantially reduced, resulting in a consequent reduction in thermal transmission between the panels 10 and 20 and the flanges 33 and 34.

In assembling the joint construction comprising this invention, the T-shaped bracket 30, as illustrated in Fig. 1, is first secured to the support 40. Panel 10 is then inserted edgewise into position with its outer surface 17 abutting the terminal section 53 of bolt 51, and with the inwardly facing surface 16 of tongue 14 contacting the bent end portion 32 of the stem 31. The resilient projection 35, as best illustrated in Fig. 4, projects into the longitudinal notch 15 in the tongue 14 and restrains the panel 10 against lateral separating movements away from panel 20, while permitting edgewise movements of the panel 10 to facilitate assembly and disassembly of the joint construction.

The grooved end portion 24 of panel 20 is then slipped over the tongue 14 of the panel 10 and cooperates with the inwardly facing surface 16 of the tongue 14 to define a cavity or recess 22 therebetween, while the inner rib 21 is forcibly inserted between the bent end portion 32 of stem 31 and the terminal portion 54 of the fastener 52 opposite said bent end portion 32. When the inner rib 21 is so inserted into the restricted channel opening, the resilient bent end portion 32 of the bracket 30 is sprung outwardly of its normal position and forced against the inwardly facing surface 16 of the tongue 14 whereby the corrugated configuration of the bent end portion will alternately engage each panel to thereby form a series of baffled air spaces or seal off the space or recess 22 at successive locations and reduce thermal transmission due to air currents between the adjoining panels 10 and 20. Additionally, the resilient corrugated construction of the bent end portion 32 of the T-shaped bracket 30 acts against the inwardly facing surface 16 of the tongue 14 and the outwardly facing surface 25 of the rib 21, and maintains the recess-defining surfaces of the panels in resiliently spaced relationship to provide a transverse thermal expansion joint between the panels 10 and 20.

Alternatively, as best shown in Fig. 4, the stem portion 61 of the T-shaped bracket 60 may also be of corrugated construction to provide a lateral resilient thermal expansion joint between the adjoining panels 10 and 20. Also, as shown in Fig. 4, insulating caps 57 and 58 may be secured to the terminal portions 53 and 54 of the bolts 51 and 52, respectively, to reduce thermal transmission between the outer surfaces 17 and 23 of the panels 10 and 20 respectively, and the bolts 51 and 52.

It will, of course, be understood that various details of construction or procedure may be modified throughout a wide range without departing from the principles of this invention, and it is, therefore, not the purpose to limit the patent granted hereon otherwise than as necessitated by the scope of the appended claims.

I claim:

1. A panel joint construction comprising in combination: adjacent insulating panels having parallel adjoining surfaces and a medial tongue on the joint edge of one panel projecting in a groove defined between a pair of spaced ribs on the joint edge of the adjacent panel, the width of said groove being in excess of the width of said tongue to provide a recess between said tongue and one of said ribs; a T-shaped bracket defining a corrugated surface portion resiliently compressed between and alternately engaging and spacing the joint edges of the respective panels, said bracket having a stem portion terminating in a bent end portion projecting into said recess and a head portion dividing into oppositely disposed flanges exteriorly of the outer surfaces of said panels, one of said flanges cooperating with said stem portion and said bent end portion to define a channel receiving the one of said ribs adjacent to said recess; fastening means for securing said head portion to a support, said fastening means having a terminal portion disposed between said flanges and said outer surfaces of said panels and spacing same apart and also stressing said bent end portion against said last-mentioned rib, to thereby provide an insulated thermal expansion joint between said panels and maintain the outer surfaces of said panels in coplanar alignment.

2. A panel joint construction comprising in combination: adjacent insulating panels having parallel adjoining surfaces and a medial tongue on the joint edge of one panel projecting in a groove defined between a pair of spaced ribs on the joint edge of the adjacent panel, the width of said groove being in excess of the width of said tongue to provide a recess between said tongue and one of said ribs; a T-shaped bracket having a head portion adapted for securement to a support, a corrugated stem portion compressed between and spacing said joint edges, and a resilient bent end portion projecting into said recess, to thereby provide an insulated thermal expansion joint between said panels.

3. A thermally insulated panel joint construction comprising in combination: a pair of adjacent insulating panels, each of said panels defining a grooved end portion and having on the oppositely disposed end portion a tongue, said tongue end of one panel nesting within said grooved end of the other panel, said tongue being relatively smaller than said grooved end and cooperating therewith to define an interior space between said panels when said panels are engaged with their outer surfaces in alignment, said tongue also defining a longitudinal notch communicating with said interior space; a bracket having a laterally projecting end portion projecting into said interior space and a corrugated surface configuration alternately engaging and spacing the nesting ends of said panels to thereby provide an insulated resilient thermal expansion joint between said panels, said bracket also having a projection extending into said longitudinal notch to thereby prevent lateral separating movement of said panels but permitting edgewise relative movements for assembly and disassembly thereof.

4. A thermally insulated panel joint construction comprising in combination: a pair of adjacent insulating panels nested in endwise tongue and groove relationship, the tongue on one of said panels being relatively smaller than the groove on the other of said panels and cooperating therewith to define an interior space between said panels when the outer surfaces of said panels are in alignment; a bracket having an outer end portion terminating exteriorly of said panels, a corrugated central body portion disposed between the nested ends of said panels and a laterally projecting end portion projecting into said interior space, said corrugated portion of said central body portion being compressed between and alternately engaging the nested ends of said panels and forming a series of baffled air spaces therebetween, to thereby provide an insulated lateral thermal expansion joint between said panels.

5. A thermally insulated panel joint construction comprising in combination: a pair of adjacent insulating panels nested in endwise tongue and groove relationship, the tongue on one of said panels being relatively smaller than the groove on the other of said panels and cooperating therewith to define an interior space between said panels when the outer surfaces of said panels are in alignment; a bracket having an outer end portion terminating exteriorly of said panels, a corrugated central body portion disposed between the nested ends of said panels and a corrugated laterally projecting end portion projecting into said interior space, the corrugated portions of said central body portion and said laterally projecting end portion each being compressed between and alternately engaging the nested ends of said panels and forming a series of baffled air spaces therebetween, to thereby provide insulated lateral and transverse thermal expansion joints between said panels.

References Cited in the file of this patent

UNITED STATES PATENTS

| | | |
|---|---|---|
| 937,667 | Wessels | Oct. 19, 1909 |
| 1,984,028 | Macleod | Dec. 11, 1934 |
| 2,009,056 | Schaffert | July 23, 1935 |
| 2,059,664 | Tashjian | Nov. 3, 1936 |
| 2,116,737 | Urbain | May 10, 1938 |
| 2,140,672 | Gray et al. | Dec. 20, 1938 |
| 2,263,795 | Balduf | Nov. 25, 1941 |
| 2,317,428 | Anderson | Apr. 27, 1943 |
| 2,335,303 | Olsen | Nov. 30, 1943 |
| 2,814,840 | Sears | Dec. 3, 1947 |